US008271341B2

(12) United States Patent
Rosenberg et al.

(10) Patent No.: US 8,271,341 B2
(45) Date of Patent: *Sep. 18, 2012

(54) MEDIA CONTENT DELIVERY SYSTEMS AND METHODS

(75) Inventors: Jeremy C. Rosenberg, Havre de Grace, MD (US); Ronald M. Yurman, Short Hills, NJ (US)

(73) Assignee: Music Choice, Horsham, PA (US)

( * ) Notice: Subject to any disclaimer, the term of this patent is extended or adjusted under 35 U.S.C. 154(b) by 1922 days.

This patent is subject to a terminal disclaimer.

(21) Appl. No.: 11/401,963

(22) Filed: Apr. 12, 2006

(65) Prior Publication Data

US 2006/0184431 A1  Aug. 17, 2006

Related U.S. Application Data

(63) Continuation-in-part of application No. 10/991,863, filed on Nov. 19, 2004, now Pat. No. 7,346,558, which is a continuation of application No. 09/547,846, filed on Apr. 12, 2000, now Pat. No. 6,879,963.

(60) Provisional application No. 60/670,228, filed on Apr. 12, 2005.

(51) Int. Cl.
*G06Q 30/00* (2006.01)

(52) U.S. Cl. ........................ 705/26.1; 725/105

(58) Field of Classification Search ............ 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2

See application file for complete search history.

(56) References Cited

U.S. PATENT DOCUMENTS

| | | | |
|---|---|---|---|
| 4,127,796 A | 11/1978 | Henderson |
| RE29,997 E | 5/1979 | den Toonder |
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 5,130,615 A | 7/1992 | George |
| 5,193,006 A | 3/1993 | Yamazaki |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,481,296 A | 1/1996 | Cragun et al. |

(Continued)

FOREIGN PATENT DOCUMENTS

EP      1 022 900 A1    7/2000

(Continued)

OTHER PUBLICATIONS

"HP-UX AAA Server A.06.00 Getting Started Guide" HP-UX 11.0, 11i v1, Hewlett-Packard Company.*

(Continued)

*Primary Examiner* — Naeem Haq
(74) *Attorney, Agent, or Firm* — Rothwell, Figg, Ernst & Manbeck, P.C.

(57) ABSTRACT

The present invention provides systems and methods for enabling a consumer to acquire media content items.

31 Claims, 8 Drawing Sheets

U.S. PATENT DOCUMENTS

| | | | |
|---|---|---|---|
| 5,534,911 | A | 7/1996 | Levitan |
| 5,550,863 | A | 8/1996 | Yurt et al. |
| 5,572,442 | A | 11/1996 | Schulhof et al. |
| 5,585,866 | A | 12/1996 | Miller et al. |
| 5,590,282 | A | 12/1996 | Clynes |
| 5,592,511 | A | 1/1997 | Schoen et al. |
| 5,617,565 | A | 4/1997 | Augenbraun et al. |
| 5,629,867 | A | 5/1997 | Goldman |
| 5,635,989 | A | 6/1997 | Rothmuller |
| 5,636,276 | A | 6/1997 | Brugger |
| 5,675,734 | A | 10/1997 | Hair |
| 5,708,780 | A | 1/1998 | Levergood et al. |
| 5,734,961 | A | 3/1998 | Castille |
| 5,753,844 | A | 5/1998 | Matsumoto |
| 5,754,939 | A | 5/1998 | Herz et al. |
| 5,761,606 | A | 6/1998 | Wolzien |
| 5,761,662 | A | 6/1998 | Dasan |
| 5,781,889 | A | 7/1998 | Martin et al. |
| 5,784,095 | A | 7/1998 | Robbins et al. |
| 5,809,246 | A | 9/1998 | Goldman |
| 5,819,049 | A | 10/1998 | Reietmann |
| 5,819,160 | A | 10/1998 | Foladare et al. |
| 5,835,487 | A | 11/1998 | Campanella |
| 5,841,979 | A | 11/1998 | Schulhof et al. |
| 5,848,398 | A | 12/1998 | Martin et al. |
| 5,861,906 | A | 1/1999 | Dunn et al. |
| 5,878,141 | A | 3/1999 | Daly et al. ............ 235/379 |
| 5,890,137 | A | 3/1999 | Koreeda |
| 5,900,830 | A | 5/1999 | Scheffler |
| 5,926,624 | A | 7/1999 | Katz et al. |
| 5,930,765 | A | 7/1999 | Martin et al. |
| 5,930,768 | A | 7/1999 | Hooban |
| 5,931,901 | A | 8/1999 | Wolfe et al. |
| 5,944,608 | A | 8/1999 | Reed et al. |
| 5,959,945 | A | 9/1999 | Kleiman |
| 5,968,120 | A | 10/1999 | Guedalia |
| 5,969,283 | A | 10/1999 | Looney et al. |
| 5,980,261 | A | 11/1999 | Mino et al. |
| 5,986,692 | A | 11/1999 | Logan et al. |
| 5,991,374 | A | 11/1999 | Hazenfield |
| 5,991,737 | A | 11/1999 | Chen |
| 6,011,761 | A | 1/2000 | Inoue |
| 6,011,854 | A | 1/2000 | Van Ryzin |
| 6,021,432 | A | 2/2000 | Sizer et al. |
| 6,025,868 | A | 2/2000 | Russo |
| 6,038,591 | A | 3/2000 | Wolfe et al. |
| 6,055,566 | A | 4/2000 | Kikinis |
| 6,085,235 | A | 7/2000 | Clarke et al. |
| 6,088,455 | A | 7/2000 | Logan et al. |
| 6,105,060 | A | 8/2000 | Rothblatt |
| 6,135,646 | A | 10/2000 | Kahn et al. |
| 6,154,772 | A | 11/2000 | Dunn et al. |
| 6,161,142 | A | 12/2000 | Wolfe et al. |
| 6,192,340 | B1 | 2/2001 | Abecassis |
| 6,223,292 | B1 | 4/2001 | Dean et al. |
| 6,226,030 | B1 | 5/2001 | Harvey et al. |
| 6,226,618 | B1 | 5/2001 | Downs et al. |
| 6,232,539 | B1 | 5/2001 | Looney et al. |
| 6,233,682 | B1 | 5/2001 | Fritsch ............ 713/168 |
| 6,243,725 | B1 | 6/2001 | Hempleman et al. |
| 6,246,672 | B1 | 6/2001 | Lumelsky |
| 6,249,281 | B1 * | 6/2001 | Chen et al. ............ 715/753 |
| 6,253,237 | B1 | 6/2001 | Story et al. |
| 6,262,772 | B1 | 7/2001 | Shen et al. |
| 6,286,139 | B1 | 9/2001 | Decinque ............ 725/5 |
| 6,324,217 | B1 | 11/2001 | Gordon |
| 6,330,595 | B1 | 12/2001 | Ullman et al. |
| 6,490,728 | B1 | 12/2002 | Kitazato et al. |
| 6,502,194 | B1 * | 12/2002 | Berman et al. ............ 726/28 |
| 6,507,727 | B1 | 1/2003 | Henrick |
| 6,792,280 | B1 | 9/2004 | Hori et al. |
| 6,879,963 | B1 | 4/2005 | Rosenberg |
| 6,976,082 | B1 * | 12/2005 | Ostermann et al. ............ 709/231 |
| 7,149,471 | B1 | 12/2006 | Arisawa et al. |
| 7,165,044 | B1 * | 1/2007 | Chaffee ............ 705/37 |
| 7,177,628 | B2 * | 2/2007 | Sommers et al. ............ 455/414.1 |
| 7,203,759 | B1 * | 4/2007 | Ostermann et al. ............ 709/231 |
| 7,346,558 | B2 | 3/2008 | Rosenberg |
| 7,424,446 | B2 * | 9/2008 | Emodi et al. ............ 705/26 |
| 7,500,261 | B1 * | 3/2009 | Myers ............ 725/105 |
| 2002/0059621 | A1 | 5/2002 | Thomas et al. |
| 2002/0078220 | A1 * | 6/2002 | Ryan ............ 709/231 |
| 2002/0120939 | A1 * | 8/2002 | Wall et al. ............ 725/87 |
| 2002/0194260 | A1 | 12/2002 | Headley et al. |
| 2002/0194619 | A1 | 12/2002 | Chang et al. |
| 2003/0028608 | A1 * | 2/2003 | Patterson ............ 709/207 |
| 2003/0050058 | A1 | 3/2003 | Walsh et al. |
| 2003/0088687 | A1 * | 5/2003 | Begeja et al. ............ 709/231 |
| 2003/0097338 | A1 | 5/2003 | Mankovich et al. |
| 2007/0282708 | A1 | 12/2007 | Rosenberg |
| 2011/0209188 | A1 * | 8/2011 | Petersson et al. ............ 725/110 |

FOREIGN PATENT DOCUMENTS

| | | |
|---|---|---|
| WO | WO 9917230 | 4/1999 |
| WO | WO 00/07368 | 2/2000 |
| WO | WO 01/36064 | 5/2001 |
| WO | WO 01/35874 | 11/2001 |

OTHER PUBLICATIONS

Sofie Van Hoecke et al. "Design and Implementation of a Secure Media Content Delivery Broker Architecture", ISWS 2005—Technical Session on Multimedia Applications using Web Services.*

AudioRequest, MP3 Home Stereo Jukebox, ReQuest, Inc.-Company Info., and NSI-WHOIS Search Results. Pages from the web site for www.request.com owned by ReQuest, Inc.

Clark D. (2000). "Click Radio to put a DJ in your PC." WSJ Interactive Edition.

ClickRadio granted first interactive radio license by universal music group. 3 pages. From the web site at www.clickradio.com, printed Apr. 26, 2000.

Gordon, C. (2000). "Click radio sidesteps competition with music licensing deals." Atnewyork.com.

Press Release. (Dec. 13, 2000). "Phillips showcases click radio on digital set-top at western show 2000." Phillips.

Six pages from the web site for www.sonicnet.com.

ntl: Digital Radio. http://www.ntl.com/locales/gb/en/guides/dummies/produce.asp.

Bower (1998). "Digital Radio—A Revolution for In-Car Entertainment" Proc. NavPos Automative '98 Conf. 2(5-8): 40-51.

Deutsche Telekom AG: Digital Radio. http://www.telekom.de/dtag/ipll/cda/level3_a/0,3680,10077,00.html.

The Eureka 147 Consortium. "Digital Audio Broadcasting" http://www.eureadab.org/eureka_147_consortium.htm.

Radio Authority (1999). Digital Radio Fact Sheet No. 4. http://www.radioauthority.org.uk/Information/Fact_Sheets/fs4.htm.

ICTV (2000). Digital Broadband System Press Release: 1-11.

Launch.com.

"Set-top box for television that reads your mind" Taylor, Paul. Dec. 30, 1998. Financial Times; London.

"Global Media Announces Launch of Independent Internet Radio station; Station Includes E-Commerce Point of Purchase for Music" (Feb. 1, 1999. Business Wire).

"Platinum Entertainment and Liquid Audio Join Forces to Offer Extensive Music Catalog via Digital Downloads" (Jul. 15, 1998. PR Newswire).

"Thinking Globally with a web-based radio station vying for listeners around the world, homegrown internet company fastband aims to shake up the music world" (LaFrance, Siona. Nov. 4, 1999. Times).

"Tune into Yahoo! Radio; Yahoo! Teams up with Broadcast.com and Spinner.com to Provide 10 Stations of Audio Programming" (May 11, 1999. business Wire).

"Yahoo! Offers one-stop shop for e-music" (Aug. 25, 1999. Milwaukee Journal Sentinel).

Yahoo! Press Release.

"WebRadio.com Signs on as Liquid Music Network Affiliate Offering Liquid Audio Digital Downloads" (Sep. 1, 1999. Business Wire).

"Blue Note Radio: Now Playing on a Computer Screen Near You. EMI's Blue Note Records Expands New Media Initiative with RadioWave.com" (Apr. 4, 2000. PR Newswire).

International Search Report and Written Opinion issued in Application No. PCT/US06/13719 on Aug. 16, 2007, 11 pp.
Office Action issued on Jul. 17, 2002 in U.S. Appl. No. 09/547,846, 8 pages.
Office Action issued on Mar. 28, 2003 in U.S. Appl. No. 09/547,846, 8 pages.
Office Action issued on Aug. 21, 2003 in U.S. Appl. No. 09/547,846, 7 pages.
Office Action issued on Feb. 12, 2004 in U.S. Appl. No. 09/547,846, 9 pages.
Office Action issued on Feb. 14, 2006 in U.S. Appl. No. 10/991,863, 12 pages.
Office Action issued on Jul. 18, 2006 in U.S. Appl. No. 10/991,863, 15 pages.

* cited by examiner

MEDIA CONTENT DELIVERY SYSTEMS AND METHODS

BACKGROUND OF THE INVENTION

This application claims the benefit of U.S. Provisional Patent Application No. 60/670,228, filed on Apr. 12, 2005; and this application is a continuation-in-part of U.S. patent application Ser. No. 10/991,863, filed on Nov. 19, 2004 (status pending), which is a continuation of U.S. patent application Ser. No. 09/547,846, filed on Apr. 12, 2000 (now U.S. Pat. No. 6,879,963). The above referenced applications are incorporated herein by this reference.

BACKGROUND OF THE INVENTION

1. Field of the Invention

This invention relates generally to content delivery systems.

2. Discussion of the Background

Conventionally, when a consumer desires to acquire (e.g., purchase, rent, or otherwise obtain) a media content item (e.g., a digital music file, a digital video file, digital book or other content that can be processed by a computer), the consumer uses a communication device (e.g., a computer or other device running a web browser or other software) to communicate with an on-line shopping service (e.g., Napster.com). The shopping service enables the consumer to browse and search for a desired media content item. Once the desired item is located, the consumer can download the item to the consumer's device. Once the item is stored on the device, the consumer can use the device to "play" (e.g., view, listen to, read, etc.) the item.

What is desired are additional systems and methods for enabling a consumer to acquire media content items.

SUMMARY OF THE INVENTION

The present invention provides systems and methods for the delivery of media content items.

A method according to one particular embodiment of the present invention includes: using a first device to receive broadcasted media content; while the first device is receiving the broadcasted media content, using the first device to transmit a message (e.g., a purchase instruction) to a fulfillment system, wherein the message includes a device identifier associated with the first device and/or a user identifier associated with a user of the first device, and, in response to receiving the message, the fulfillment system (a) uses the device identifier (e.g., a set-top box's unique address for authorization of receipt of broadcast material by a cable operator) and/or the user identifier to retrieve from a database a device or virtual address (e.g., an e-mail address, telephone number, etc.) associated with the device identifier and/or the user identifier and (b) sends to the retrieved address a transmission (e.g., an e-mail message, text message, or other message) comprising (i) a link associated with a media content item corresponding to the broadcast media content and/or (ii) the media content item itself.

A method according to another embodiment includes: transmitting media content simultaneously to a plurality of remote devices; while transmitting the media content to the plurality of remote devices, receiving from one of the plurality of remote devices a message, wherein the message includes a device identifier associated with said one of the plurality of remote devices and/or a user identifier associated with a user of the device; and upon receiving the message, (a) using the device and/or user identifier to retrieve a device or virtual address (e.g., an e-mail address, telephone number, etc.) from a database; and (b) sending to the retrieved address a transmission comprising (i) a link associated with a media content item corresponding to the transmitted media content and/or (ii) the media content item itself.

A method according to another embodiment includes: receiving at a user device a set of identifiers transmitted from a media-on-demand system, each identifier identifying a different media content item; enabling the user to select one of the media content items; in response to the user selecting one of the items, transmitting from the user device to the media-on-demand system an identifier identifying the selected item; after transmitting the identifier to the media-on-demand system, receiving from the media-on-demand system the selected media content item and meta-data associated with the selected media content item, wherein the user device upon receiving the recording plays the media content item for the user and the meta-data indicates that the media content item (or a version thereof) may be acquired by the user; storing the media content item and meta-data received from the media-on-demand system in a storage device contained within or directly connected to the user device; retrieving from the storage device the stored item and meta-data in response to a command from the user; playing the retrieved item for a user of the user device; while playing the retrieved item, receiving at the user device an indication from the user that the user desires to acquire the item; and in response to receiving the indication, transmitting a message to a fulfillment system, wherein the message includes a device identifier associated with the user device and/or a user identifier associated with a user of said device, and in response to receiving the message, the fulfillment system uses the device and/or user identifier to determine a delivery address associated with the device and/or user identifier and delivers the item (or a version thereof) to the delivery address.

A method according to another embodiment of includes: transmitting media content simultaneously to a plurality of remote devices; while transmitting the media content to the plurality of remote devices, receiving from one of the plurality of remote device a message containing a device identifier associated with said one of the plurality of remote devices and/or a user identifier associated with a user of said device; and upon receiving the message, (a) using the device and/or user identifier to retrieve a delivery address from a database; and (b) transmitting to the delivery address an item corresponding to the transmitted media content, wherein the delivery address is a virtual address of a mobile telephone (e.g., phone number, mobile identification number, or other unit id), the media content includes music, and the item corresponding to the media content is an audio file.

A method according to another embodiment of includes: transmitting media content to a remote device, wherein an obtainable item is associated with the media content; storing a plurality of media files corresponding to the transmitted media content, wherein each of said media files stores a different version of the obtainable item; while transmitting the media content to the remote device, receiving from the remote device a message, wherein the message includes a device identifier associated with said remote device and/or a user identifier associated with a user of the device; and upon receiving the message, (a) using the device and/or user identifier to retrieve from a database information associated with the identifier, wherein the information includes a delivery address; (b) selecting from among the plurality of media files a single one of the media files, wherein the selection is based on information in the message and/or at least some of the retrieved information, and (c) transmitting to the delivery address the selected media file and/or a link to the selected media file.

The above and other features and advantages of the various aspects of the present invention, as well as the structure and operation of preferred embodiments, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

DETAILED DESCRIPTION OF PREFERRED EMBODIMENTS

One embodiment of the present invention provides a cross-channel content delivery system. The cross-channel content delivery system enables a user to use a first device (e.g., a personal computer) to purchase an item and provides the item to the user by transmitting the item to a second device (e.g., the user's mobile phone, the user's e-mail server, a web server, an FTP server, or other device).

Figure 1:
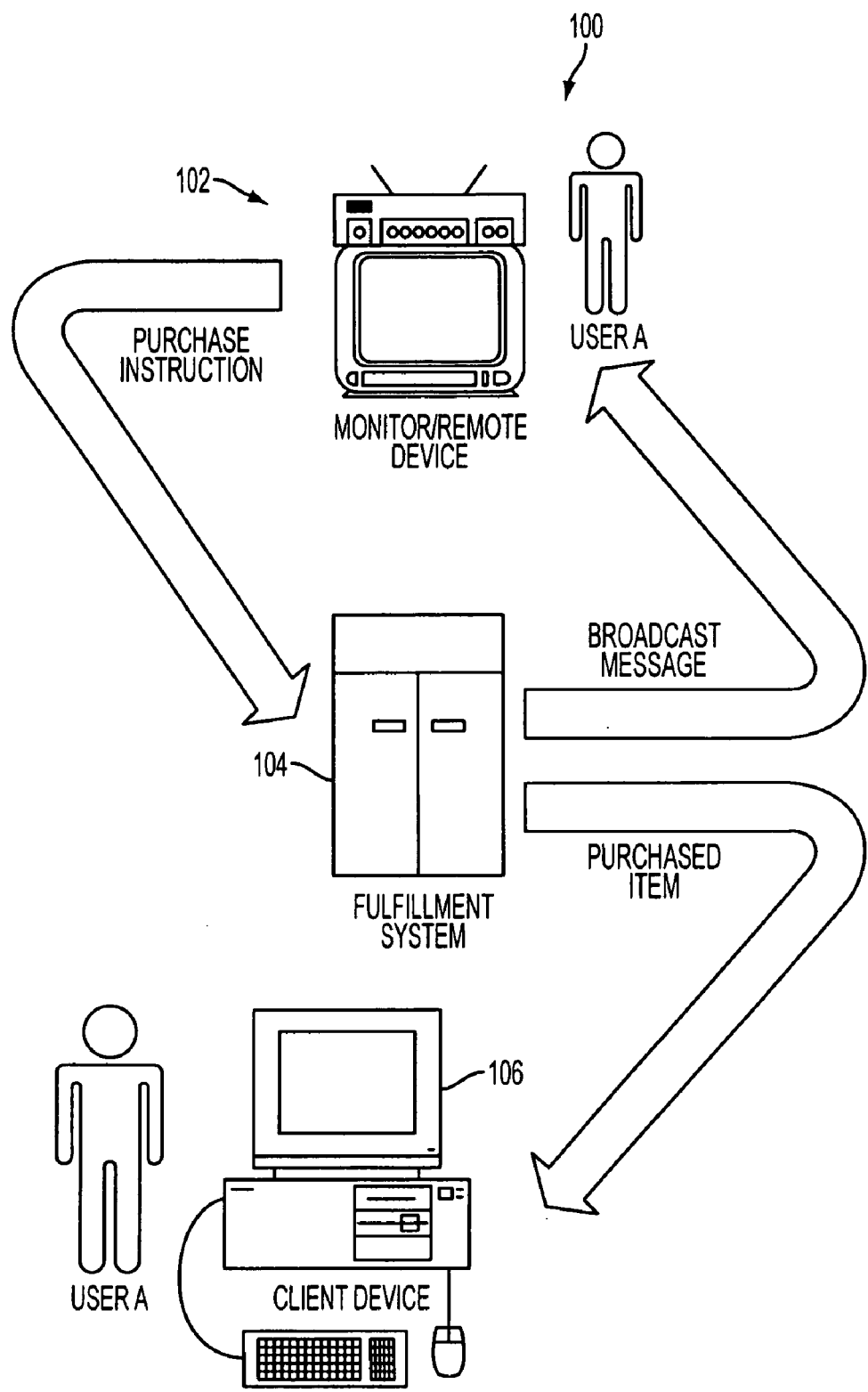
FIG. 1 illustrates a cross-channel content delivery system 100 according to an embodiment of the invention.

FIG. 1 illustrates a cross-channel content delivery system 100 according to an embodiment of the invention. System 100 includes a remote device 102, a broadcast and fulfillment system 104, and a client device 106.

In one embodiment, system 104 "broadcasts" information (the term "broadcast," as used herein, means "to simultaneously transmit to multiple remote devices"). The broadcast information may identify a purchasable item, a version of which can be delivered via a network (e.g., a digital music track, a digital music video, or other item that be transmitted from one communication device to another). For example, the information can include information about a song (e.g., the song's title, the song's artist, etc.) that is available for purchase, or the information could be the song itself or a music video corresponding to the song.

Remote device 102 is capable of receiving the broadcast information and outputting the information using a video display and/or speakers so that the user can view and/or listen to the information. Remote device 102 may include a caching mechanism for storing recently received broadcast information, so, in case the user does not receive the broadcast information at the time it is broadcast, the user can receive the information at a later time by instructing device 102 to retrieve it from the cache and output it for the user.

If the user desires to purchase or otherwise obtain the item identified by the information while the user is viewing and/or listening to the information, the user may instruct remote device 102 to transmit a message (hereafter "purchase instruction") to system 104.

In some embodiments, the user may so instruct device 102 by using an input device, such as a remote control device, that communicates with device 102. For example, the user can use the input device to navigate a menu system provided by device 102 and select a "get it now" menu option or select a predefined button on the input device.

The purchase instruction may include payment information (e.g., a credit card number, an account number, etc.), delivery information (e.g., e-mail address), product information (e.g., an SKU identifying the purchasable item), preferred format information, and/or an identifier uniquely associated with remote device 102 and/or a user. Remote device 102 may transmit the purchase instruction in real-time, periodically on a scheduled basis, or when polled by system 104.

When a purchase instruction is received at system 104, system 104 processes the instruction. For example, in some embodiments, system 104 uses the identifier uniquely associated with remote device 102 and/or the user to retrieve from a database system 332 (see FIG. 3) payment information, delivery information, and/or format information.

If the purchase instruction and database system 332 (hereafter "database 332") do not contain delivery or payment information, system 104 may transmit a message to remote device 102 that prompts the user to input the missing delivery and/or payment information. Otherwise, the purchase instruction may be considered valid, and the item may be electronically delivered in accordance with the delivery information.

The delivery information may specify that the purchased item should be stored in a particular "electronic locker" (e.g., a storage device 702 accessible to a server 704—a web server, an FTP server, a mail server, or other server) or directly transmitted to a particular device (e.g., device 106 or other device).

Figure 7:
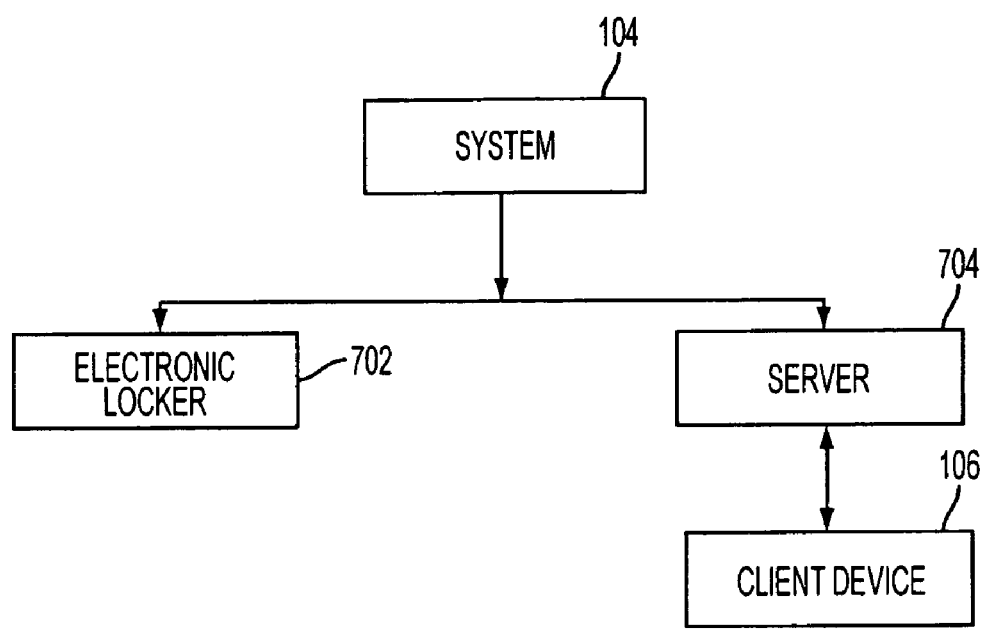
FIG. 7 illustrates components that may be used in embodiments of the invention.

As one example, the delivery information may specify that the a delivery message (e.g., an e-mail or text message) be transmitted to a particular address and (a) the item should be included in the message (e.g., attached to the e-mail) or (b) the message should include a direct link (e.g., a hyperlink) to the item stored in the electronic locker 702 (see FIG. 7) or a link to the server 704 having access to the electronic locker 702 where the item is stored. In this example, the item may be a computer file, which may store media content.

Additionally, in some embodiments, system 104 may include in the delivery message commands that instruct the device receiving the message to automatically download the purchased item from a server identified in the message. Accordingly, in such embodiments, the message may include an identifier identifying the purchased item and a system identifier identifying a system and location where the item is stored.

As another specific example, the purchased item may be stored on a storage device accessible to a World-Wide-Web ("Web") server and/or FTP server and, rather than attaching the item to an e-mail message or other message, the delivery message may contain a direct link to the item (e.g., http://www.www-system.com/digital-file.mp3 and/or ftp://www-.ftp-system.com/digital-file.mp3). Thus, when the user uses a computer to read the message, the user can download the digital file simply by clicking on the link or entering the link into a Web browser or an FTP client. Additionally, the device receiving the message may be configured to automatically download the purchased item.

Alternatively, the link may not be a direct link to the media content item, but to the server that has access to the storage system in which the media content item is stored. Clicking on the link in this case would send a request to the server. The server may respond by prompting the user to enter some information (e.g., user-ID and access code and/or credit card information). Only after the user enters the information and the information is verified by the server will the user be allowed to download the media content item.

In embodiments where the item is stored in an electronic locker 702 and an e-mail including the item and/or a link to the item is sent to a specified address, the user can use client device 106 to obtain the item from the electronic locker 702. For example, the user can use device 106 to read the e-mail and store the item on device 106. If the item is not attached to the e-mail, the user can use device 106 to read the e-mail and activate (e.g., click on) the link included in the e-mail, thereby initiating the downloading of the item to device 106.

The cross channel fulfillment system 100, according to the above described embodiment, provides a number of benefits over traditional electronic ordering systems. First, system 100 broadcasts information corresponding to purchasable items to a plurality of users. This simple approach enables system 100 to make many offers to many users at the same time. Unlike traditional delivery systems where the user initiates the shopping session, system 100 provides information relating to purchasable items to users without any user interaction. Moreover, by broadcasting the information, a user may first see (or listen to) the purchasable item before deciding whether to purchase it.

Additionally, system 104 may implement non-real time back-channel delivery. That is, if there is excessive load at the time a user transmits a purchase instruction to the system 104, system 104 delivers the purchased items at a later time.

Figure 2A:
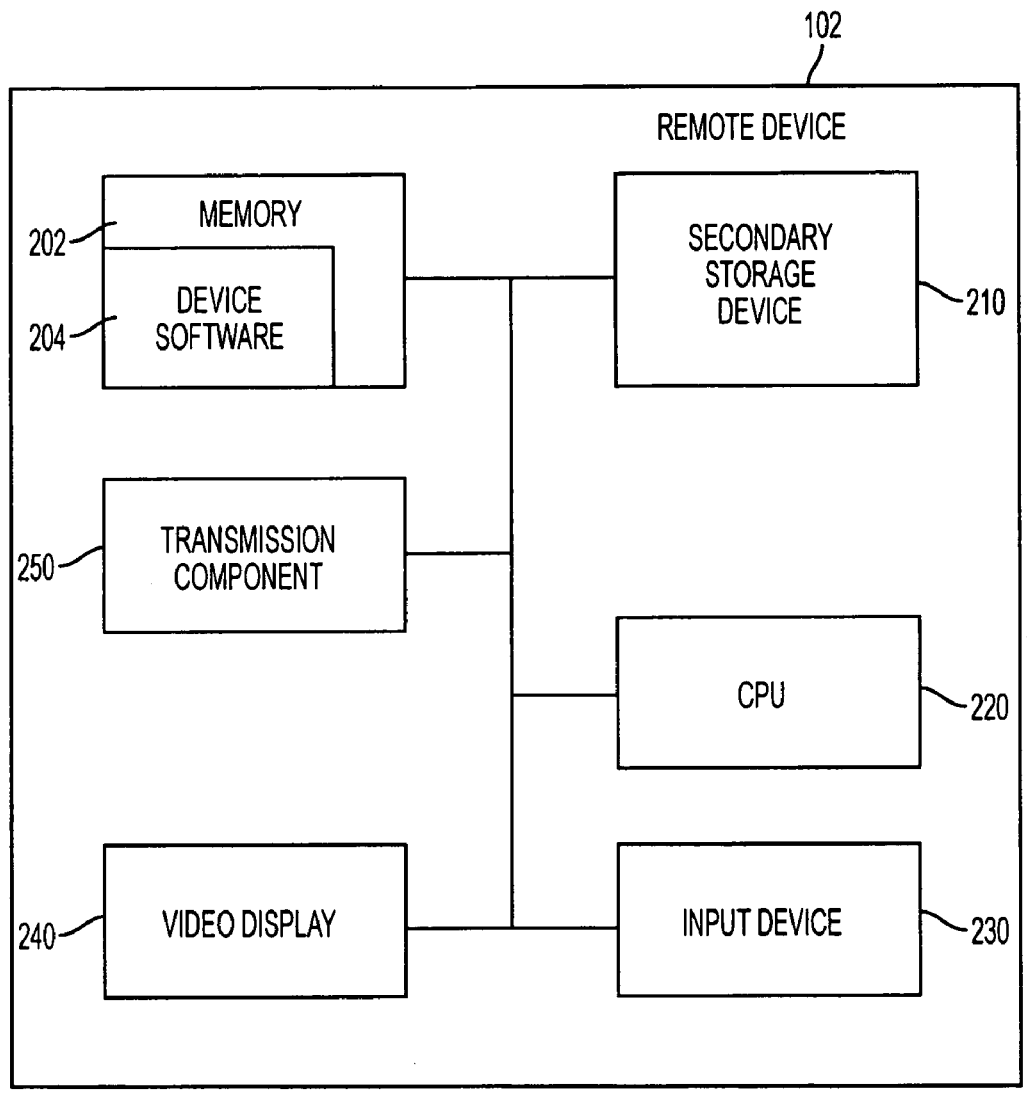
FIG. 2A illustrates remote device 102 according to one embodiment.

Referring now to FIG. 2A, FIG. 2A illustrates remote device 102 according to one embodiment. As shown, device 102 may include a memory 202, a secondary storage device 210, a central processing unit (CPU) 220, an input device 230, a video display 240, and a transmission component 250. Memory 202 contains software 204 that enables device 102 to send instructions (e.g., purchase instructions) to system 104. Secondary storage device 210 may contain unique identification information that identifies remote device 102 or a user, such as an identification number or username. Transmission component 250 enables device 102 to communicate with system 104 (i.e., to receive information broadcast from system 104 and to transmit instructions to system 104). One skilled in the art will appreciate that remote device 102 may be composed of a single component or multiple, separate components, such as a settop-box for a television and a storage device (e.g., external hard drive).

Figure 2B:
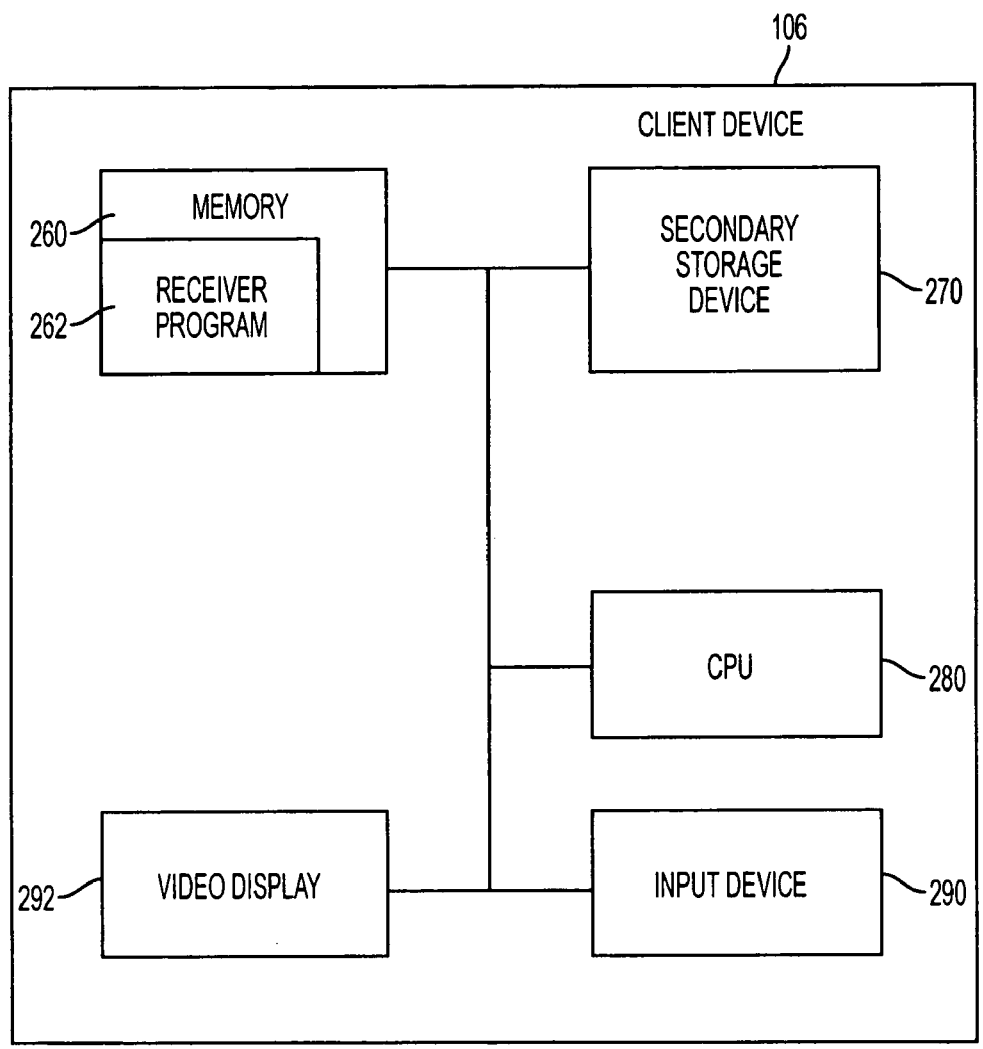
FIG. 2B illustrates device 106 according to one embodiment.

Referring now to FIG. 2B, FIG. 2B illustrates device 106 according to one embodiment. As shown, device 106 may include a memory 260, a secondary storage device 270, a CPU 280, an input device 290, and a video display 292. Memory 260 includes a computer program 262 that allows a user to obtain purchased items. For example, program 262 may be an e-mail program, a web browser, a media player, or other computer program.

Figure 3:
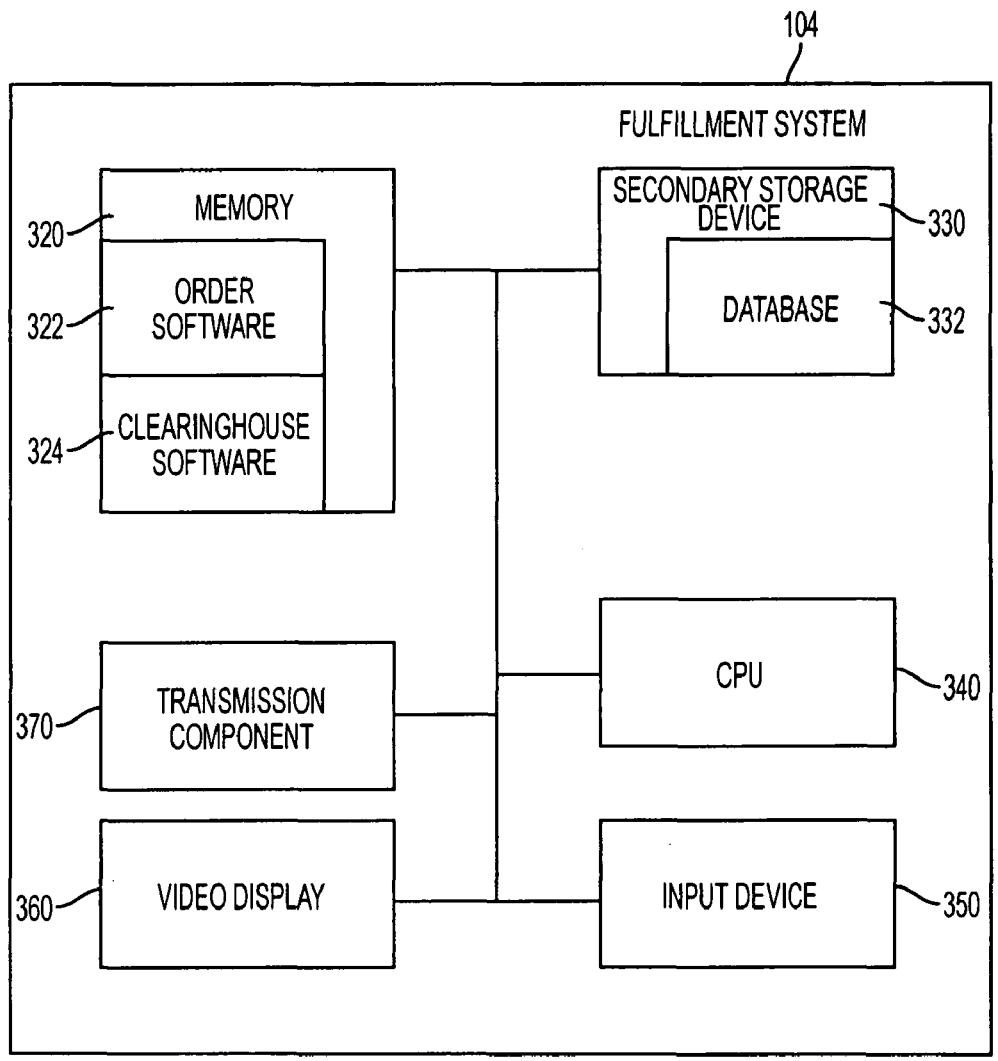
FIG. 3 illustrates system 104 according to one embodiment.

Referring now to FIG. 3, FIG. 3 illustrates system 104 according to one embodiment. In the embodiment shown, system 104 includes a memory 320, a secondary storage device 330, a CPU 340, an input device 350, a video display 360, and a transmission component 370. Memory 320 may include order software 322 and clearinghouse software 324, which can be configured to implement the functions of system 104 described herein. For example, order software 322 may be configured to determine whether a user is authorized to purchase a purchasable item, and clearinghouse software 324 may be configured to cross reference remote device identifications with delivery information as well as payment information, as described above. Clearinghouse software may also be configured to make a purchased item available to be downloaded by client device 106 and/or transmit the item to client device 106. Secondary storage device 330 may contain a database 332 that correlates information associated with users and/or devices 102 with payment and/or delivery information. Transmission component 370 may broadcast information to and receive purchase instructions from a remote device 102.

One skilled in the art will appreciate that system 104 may be composed of a single device or multiple, separate devices, that may or may not communicate with each other and that may or may not be co-located.

Figure 4:
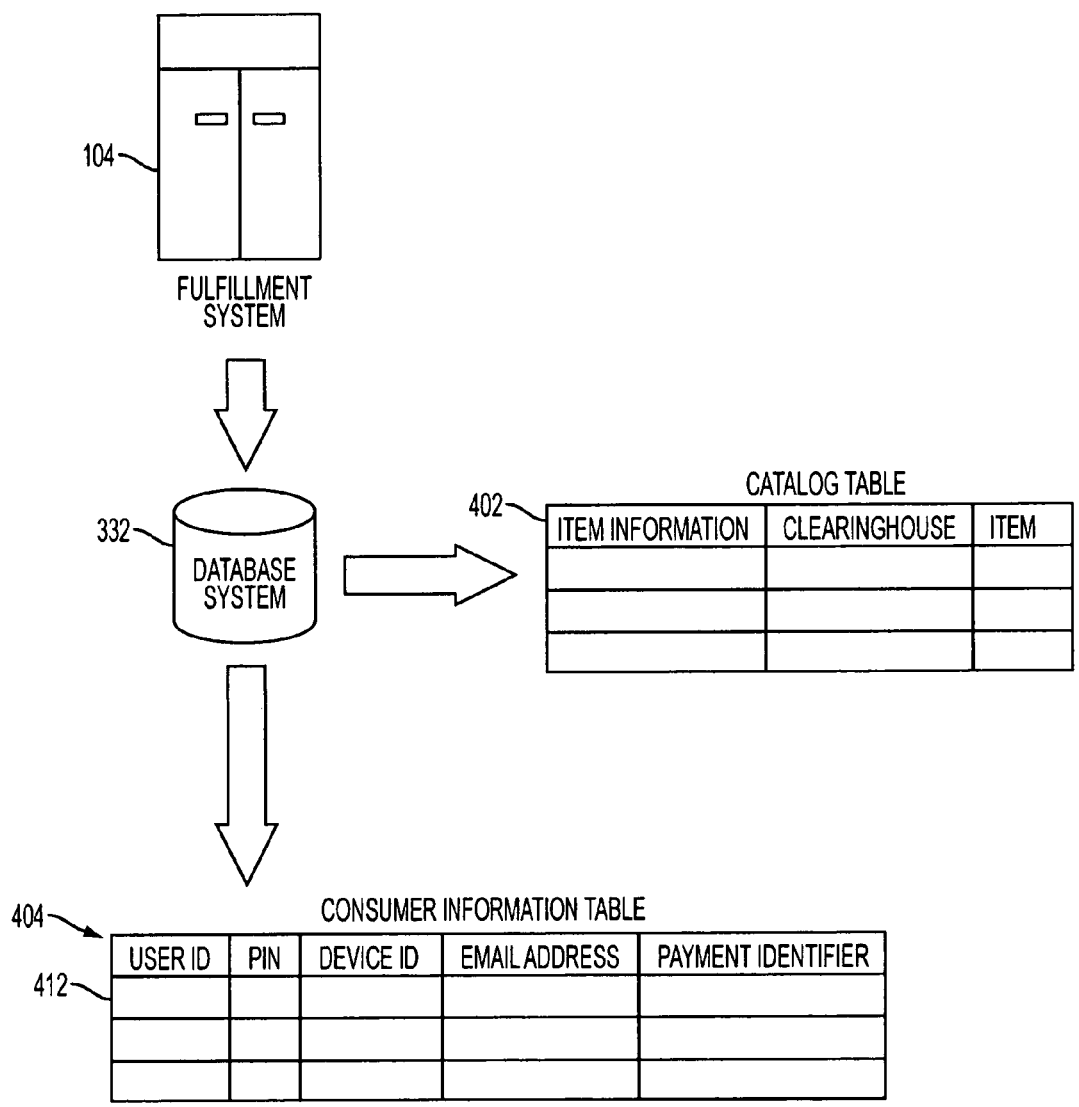
FIG. 4 illustrates database 332 according to one embodiment.

Referring now to FIG. 4, FIG. 4 illustrates database 332 according to one embodiment. In the embodiment shown, database 332 contains a catalog information table 402 and a user information table 404. Catalog information table 402 contains information associated with all purchasable items, such as a unique identification number (e.g., a SKU), purchasable item name, and a list of one or more filenames that identify files corresponding to the item. Each identified file may contain a different version of the item.

Information table 404 contains information corresponding to users and/or devices. For example, if a user has previously registered with system 104, then table 404 may have a record of information (e.g., a row) for the user. A user may register with system 104 by submitting billing, payment, and identification information.

A record from table 404 (e.g., record 412) may include one more of the following: a user identification; an access code; a remote device identification; delivery information; a payment information (e.g., credit card); format information, etc. The delivery information may include an address to which a delivery message should be transmitted. For example, the delivery information may include one, or any combination of, the following: an e-mail address, a network address (e.g., an IP address), a telephone number, a mobile identification number, or another address of a device.

In some embodiments, when the delivery information includes the address of a client device (e.g., the telephone number of a mobile phone), the delivery information may also include the make and model of the client device. By storing the make and model of the client device, system 104 can be programmed to automatically determine the format or formats that the client device can play.

One skilled in the art will appreciate that database system 332 may contain additional information, and may consist of one or more databases. For example, database 332 may include a database of an Internet Service Provider (ISP) that contains information relating to delivery information and a database of a cable operator that contains information relating to payment information and user information.

Figure 5:
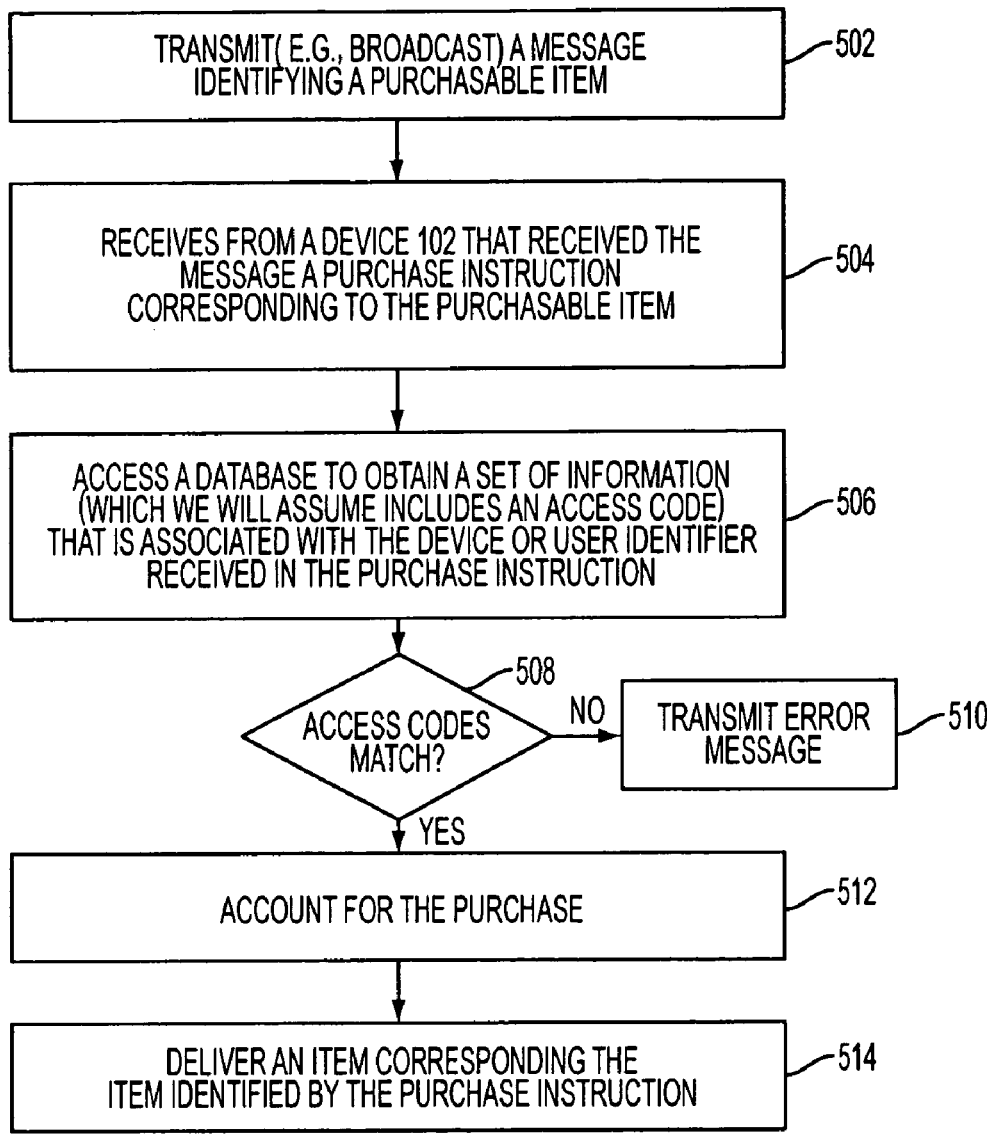
FIG. 5 is a flow chart illustrating a process according to an embodiment of the invention.

Referring now to FIG. 5, FIG. 5 is a flow chart illustrating a process according to one embodiment of the invention. The process may begin in step 502, where system 104 transmits (e.g., broadcasts) information identifying an obtainable item (e.g., an item that may be purchased or acquired free of charge). System 104 may use transmission component 370 to transmit the information.

In step 504, system 104 receives a "purchase instruction" (i.e., a message) corresponding to the item from a device 102 that received the information. The purchase instruction may include an identifier associated with the item and an identifier associated with device 102 or a user, which device or user identifier is associated with a set of information in one or more databases (e.g., a particular row of table 404 in database 332).

The purchase instruction may also include additional information, such as, for example, an access code (e.g., a password or PIN), one or more delivery addresses, a format identifier for each delivery address, etc. For the sake of illustration, we shall assume the purchase instruction includes an access code.

In step 506, system 104 accesses a database to obtain a set of information (which we will assume includes an access code) that is associated with the device or user identifier received in the purchase instruction. For example, in step 506, system 104 may use the device or user identifier received in the purchase instruction to retrieve from table 404 the row that corresponds to the device or user identifier.

In step 508, system 104 checks if the access code included in the instruction matches the access code retrieved from the database. If the codes do not match, system 104 may transmit an error message to the remote device 102 that transmitted the purchase instruction (step 510).

If the codes match, system 104 may account for the purchase (step 512). To account for the purchase, system 104 may perform a billing function, such as charging the user's credit card or creating a billing record or the like.

After the purchase is accounted for, system 104 "delivers" an item corresponding the item identified by the purchase instruction (step 514). For example, the identified item may be track from CD, a music video, a movie, or other item, and the delivered item may be a computer file containing a version of the song, movie, music video, etc. Because an item may come in a variety of versions, system 104 may store, for each obtainable item, multiple computer files, with each computer file containing a different version of the item. As a specific example, a track from a CD can be available in a number of versions, such as a ringtone version that is encoded at one bit-rate, a high-quality version that is encoded at higher bit-rate, a Windows Media version, an iTunes version, an R rated version, a PG13 version, etc. Accordingly, for such a track, system 104 may store multiple computer files, with each of the computer files containing a different version of the track.

Accordingly, the item that is delivered in step 514 is selected by system 104 based, at least in part, on the item identified by the purchase instruction. The specific item that is delivered may also be selected based on other factors. For example, if system 104 determines that the purchase instruction or the information retrieved in step 506 indicates that the consumer has specified a particular version (e.g., format) of the item, then system 104 will delivery the specified version of the item. In some embodiments, if neither the purchase instruction nor the information retrieved in step 506 indicates that the consumer has specified a particular version, system 104 may select a particular version of the item based on the device to which the system 104 delivers the item.

As discussed above, there are many ways in which system 104 can deliver the item. System 104 may deliver the item by storing a copy of the item in an electronic locker and then sending a message (e.g., an e-mail) to an address associated in the database with the user and/or device identifier. The message may contain a direct link to the item in the locker and/or a link to a server that has access to the locker. As another example, system 104 may transmit the item by attaching the item to an e-mail and then transmitting the e-mail to the address. Additionally, the item (which may be a ringtone or other music file) may be transmitted to a mobile phone, in which case the retrieved address may be a telephone number or other address that uniquely identifies the phone.

One skilled in the art will appreciate that the message transmission channel may share some physical plant with the broadcast channel such as in a cable plant which is engineered with broadcast channel capability in one part of the spectrum and broadband channel capability, which might be used for transmittal of the message, in another part of the spectrum.

Figure 6:
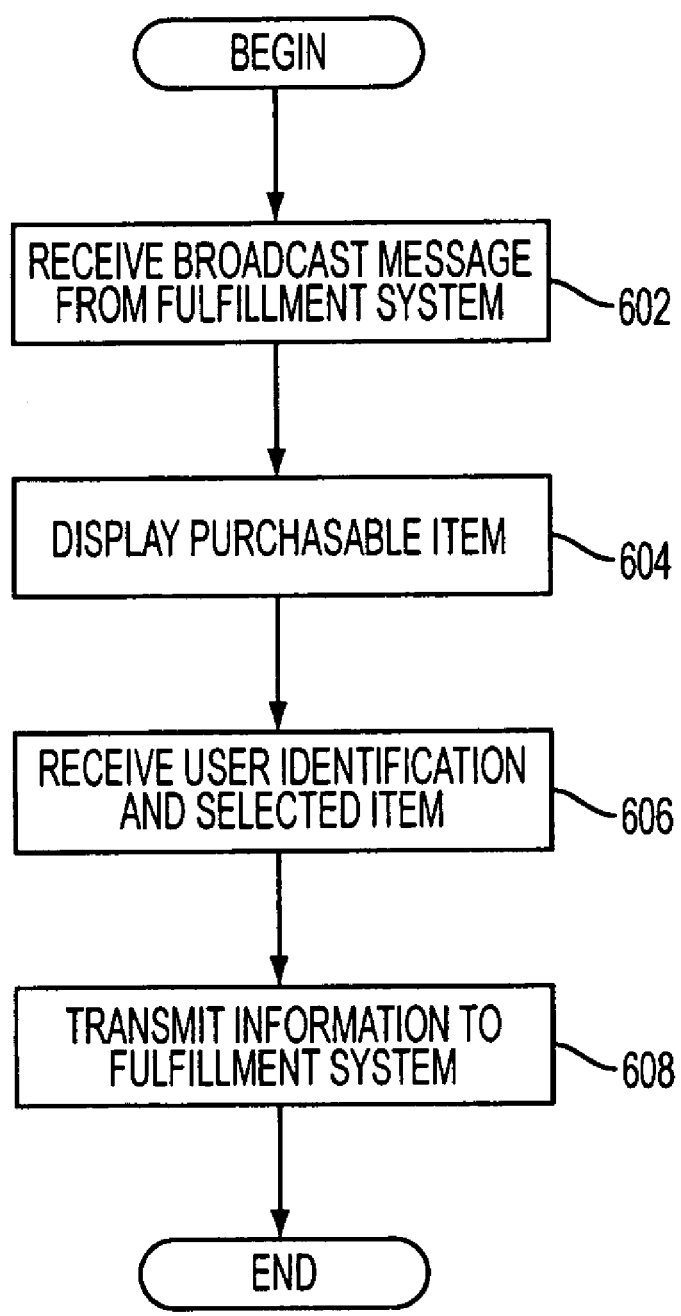
FIG. 6 is a flow chart illustrating a process according to another aspect of the invention.

Referring now to FIG. 6, FIG. 6 is a flow chart illustrating a process according to another embodiment of the invention. The process may begin in step 602, where remote device 102 receives a broadcast from system 104. For the sake of illustration, we will assume the broadcast contains a streamed audio track from a CD as well as a track identification code (e.g., SKU) (however, the broadcast may identify any computer purchasable item). The user may first listen to the track and, if the user decides to acquire a copy of the track, may do so. The track may be stored for a predetermined period of time in memory 202 of remote device 102. This way, the user may access the track at a later period.

Once received at system 104, remote device 102 may display on video display 260 at least some of the received broadcast information (step 604). For example, the broadcast information may include the name of the artist that recorded the track as well as information about the artist or the track and this information may be displayed to the user.

If the user desires to acquire the track, the user may instruct device 102 to transmit a purchase instruction to system 104. In response to receiving the instruction, device 102 may prompt the user to input user information (e.g., username and/or access code) and may retrieve from memory 202 an identifier that identifies the track (step 606). Next, remote device 102 transmits a purchase instruction to system 104 (step 608). The transmitted purchase instruction may include the user identification information, an identifier identifying the selected item to be purchased (e.g., the track identifier), and an identifier identifying remote device 102. System 104 may then process the purchase instruction as described above.

Additional Embodiments

In some embodiments, system 104 may be a cable head end or a component of a cable head end and/or may include a media on-demand (MOD) system (e.g., a video on-demand (VOD) system or other media on-demand system) or the like. In these embodiments, a user may use remote device 102 to select content offered by the MOD system. The content offered by the MOD system may include video recordings (e.g., music videos) or audio recordings (e.g., recorded music, such as tracks recorded by particular artists). For example, the MOD system may transmit a list of recordings to device 102, which then displays the list so that a user of the device 102 can select at least one of the recordings.

In response to the user selecting a recording, the MOD system transmits a copy of the recording to the user's device 102 so that the user can watch and/or listen to the recording.

In some embodiments, in addition to transmitting content (e.g., a selected recording or audio/video data from a live event or show), the system 104 may also transmit meta-data to the user's device 102. In these embodiments, device 102 may include a client application (e.g., device software 204) for processing the meta-data. The meta-data may include information that indicates that the content or a portion of the content is available for sale or is available to be acquired free of charge.

Accordingly, in some embodiments, the application, in response to receiving meta-data that indicates the content (or portion thereof) is available to be purchased or acquired free of charge by the user, may display an indicator (e.g., a small icon) on display 240, which indicator may be used to inform the user that the content the user is watching/listening to can be purchased or acquired free of charge by the user.

In some embodiments, device 102 may include or be directly connected to a recording device (e.g., a digital audio/video recorder or other device capable of storing digital audio and/or video). In these embodiments, the user of device 102 can record onto the recording device the information that is transmitted to device 102. Preferably, if content and meta-data are transmitted to device 102, the user can record onto the recording device not only the content, but also the associated meta-data. Additionally, it is preferred that when device 102 retrieves content from the recording device and plays the content for the user (e.g., in response to a command from the user instructing device 102 to retrieve and play particular stored content) so that the user can view and/or listen to the content, device 102 also retrieves and processes the meta-data associated with the content.

Accordingly, in some embodiments, the application, in response to processing meta-data that indicates the content (or portion thereof) is available to be acquired by the user (either free of charge or after making a payment), may display an indicator (e.g., a small icon) on display 240, which indicator is used to inform the user that the stored content the user is watching/listening to can be acquired by the user.

When device 102 is playing content received from system 104 (or retrieved from the recording device) and the user wants to acquire a digital file containing the content, the user may send a command to device 102. For example, the user may activate a "get it now" button on a remote control of device 102 or may select a "get it now" menu option. In response, the client application may determine whether the content that is currently being played by device 102 is available to be acquired. The client application may determine this by determining whether there is any meta-data with the content that indicates that a copy of the content may be acquired by the user.

If the client application determines that a copy of the content may not be acquired, then the client application may display an appropriate message to the user (e.g., the message may say, "this content is not available"). If the client application determines that the content is available, then the client application may transmit a purchase instruction to system 104, as discussed herein.

As discussed above, in some embodiments, prior to transmitting the purchase instruction to system 104, the client application may prompt the user to enter information, such as a user identifier (e.g., a username). Also, the client application may prompt for additional information, such as, for example, an access code, one or more delivery addresses, preferred formats, etc. In these embodiments, device 102 transmits the purchase instruction after receiving the user identifier and additional information, if any. The user identifier and additional information may be included in the purchase instruction.

As discussed herein, when a purchase instruction is received at system 104, system 104 processes the instruction. For example, for content that is available to be purchased (as opposed to available free of charge), system 104 may use the user identifier and access code, if any, included in the instruction to access account information associated with the user identifier for the purpose of determining whether the user is authorized to purchase the content (e.g., system 104 may determine whether the user has sufficient funds to purchase the content). If the user is authorized or the content is available free of charge, then a digital file containing the content may be delivered to the address or addresses included in the instruction or retrieved from the database.

Accordingly, in some embodiments, the purchased item may be sent to one or more devices or systems. In some embodiments, the item may be streamed to the one or more devices or systems.

As an example, the user may have used device 102 to purchase a song corresponding to a music video that was transmitted from system 104 to device 102 (or that was stored in the recording device), and system 104, in response to receiving a valid purchase instruction, may transmit to a first address (e.g., an electronic locker) a first digital file containing the song and may also transmit to a second address (e.g., the user's mobile phone, the user's home or work computer, a gaming console, or other device) a second digital file containing the song. System 104 may determine the addresses by retrieving information from the database 332 and/or purchase instruction.

Additionally, the format of the content in the first digital file may be the same or different than the format of the content in the second digital file. For example, if the second digital file is transmitted to the user's mobile phone, the format of the content in the second digital file may be a ring-tone format or other format suitable for a mobile phone (e.g., AAC+ at 64 kbs), whereas if the first digital file is transmitted to the user's e-mail account as an attachment to an e-mail, the format of the content in the first digital file may be in the Windows Media format at 128 kbps. System 104 may determine the format to transmit to each address by retrieving information from the database 332 and/or purchase instruction (each delivery address may be associated in the database 332 with a specified format).

In some embodiments, system 104 may have intelligence built in so that system 104 can automatically send the content in the correct or preferred format. For example, in some embodiments, the consumer information table 404 may include information that identifies some or all of the consumer's devices and information regarding the consumer's preferred format. For instance, each delivery address included in table 404 may be associated with a different preferred format, thereby enabling system 104 to transmit to each delivery address the item in the correct preferred format.

Additionally, database 332 may include a device table that contains information on a large number of devices. Thus, if the consumer selects to have the content delivered to a particular device, system 104 can be programmed to consult the device table to determine which formats are suitable for the device. If the device table indicates that the particular device can process only one format, the system 104 may send to that device only content that is in the one format. If the device table indicates that the particular device can process multiple formats, then system 104 may check table 404 to determine the consumer's preferred format for the device.

In some embodiments, rather than transmitting the entire item to a delivery address, only a part of the item (e.g., 99% of the item or some other percentage of the item) is transmitted. In such an embodiment, the user would preferably be provided with a link and/or instructions for how to obtain the remainder of the item. As one specific example, the user may purchase a song and an encrypted digital file containing the song may be sent to the user as an attachment to an e-mail, but the e-mail does not include the license that is needed to unlock (decrypt) the encrypted digital file. In such an example, the information in the e-mail may include a pointer to a license server (e.g., a link to a web page that the user must visit in order for the user to obtain the license). The pointer to the license server may be included in the body of the e-mail or in a header portion of the digital file containing the purchased item.

Referring back to FIG. 4, in some embodiments, consumer information table 404 or another table of database 332, may store user demographic information (e.g., information about the user such as the user's age, sex, zip code of residence, income, education level, etc.). This information may be used to filter the content that may be transmitted to the user. For example, if a user is watching a music video transmitted from system 104 or retrieved from a local recording device and the user desires to purchase a digital file containing the song associated with the music video and the song has two versions (e.g., a PG rated version and an R or MA rated version), then system 104 can use the age information associated with the user to select which version of the song to make available to the user for purchase. Obviously, if the age information indicates that the user is under 16 years of age, then system 104 will not enable the user to purchase the MA rated version of the song, but will enable the user to purchase the PG version.

Another feature of the present invention is that it can give a user an option between immediate and delayed delivery of a purchased item. Additionally, the system can offer tiered pricing based on, for example, immediate versus later delivery of the purchased item. For example, the price for immediate delivery of a digital file may be set higher than the price for a delayed delivery of the exact same digital file.

In another embodiment, when a user is using device 102 (e.g., a mobile phone or any other device) to watch/listen to a recording or a live event and the user selects a "get it now" option by, for example, pressing a button on device 102 or otherwise, device 102 may be configured to send a message to a client device 106 or another remote device 102 in response to the user selecting the "get it now" option, as opposed to transmitting a purchase instruction to system 104. In such an embodiment, in response to receiving the message, the device receiving the message from the device 102/106 may send the purchase instruction to system 104, which may then process the purchase instruction as described herein. This embodiment may be useful in situations where the user's remote device 102 is unable to communicate directly with system 104, but is able to directly communicate with a client device 106 or another remote device 102 that is able to communicate with system 104.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed simultaneously.

What is claimed is:

1. A media content delivery method, comprising:
using a first device to receive and process broadcasted media content;
while the first device is receiving and processing the broadcasted media content, using the first device to transmit to a server a request for a media content item associated with the broadcasted media content, wherein the request for the media content item includes a device identifier associated with the first device and/or a user identifier associated with a user of the first device, and
the server is configured such that after receiving the request, the server (a) uses the device identifier and/or the user identifier that was included in the request for the media content item to select a delivery address to which to send a response, wherein the selected delivery address is associated with a second device that is different than the first device and (b) sends to the selected delivery address the response, wherein the response comprises (i) a message comprising a link associated with the media content item and/or (ii) the media content item itself.

2. The method of claim 1, wherein the response includes the message comprising the link, and the response is transmitted via e-mail.

3. The method of claim 2, further comprising:
using a third device to view the message;
activating the link, thereby initiating the downloading of the media content item associated with the link to the third device; and
after activating the link, receiving the item at the third device.

4. The method of claim 1, wherein the response includes the message comprising the link, and the link is a direct link to the item.

5. The method of claim 1, wherein the response includes the message comprising the link, and the link is a link to a server that has access to the item.

6. The method of claim 5, wherein, in response to activating the link, a third device transmits a second request to a server and the server responds to the second request by transmitting a second response to the second device, wherein the second response prompts the user of the third device to enter an access code.

7. The method of claim 6, wherein the second response is an HTML document.

8. The method of claim 1, wherein the broadcasted media content is a track from a CD and the media content item is digital file containing the track from the CD.

9. The method of claim 1, wherein the broadcasted media content is a music video and the media content item is digital file containing the song from the music video.

10. The method of claim 1, wherein the message is an e-mail message and the media content item is attached to the e-mail message.

11. The method of claim 1, wherein the first device processes the broadcasted media content by playing the received broadcasted media content for a user of the first device.

12. The method of claim 1, wherein the server is configured such that the server selects the delivery address by using the device identifier and/or the user identifier to retrieve from a database an address associated with the device identifier and/or the user identifier.

13. The method of claim 1, wherein the selected delivery address is not an address belonging to said first device.

14. The method of claim 1, wherein the server is configured such that the server uses the device identifier and/or the user identifier to select the delivery address by obtaining from a database a set of information that is associated with the device identifier and/or the user identifier.

15. A media content delivery method, comprising:
transmitting media content simultaneously to a plurality of remote devices;
while transmitting the media content to the plurality of remote devices, receiving from one of the plurality of remote device a request for a media content item associated with the transmitted media content, wherein the request for the media content item includes a device identifier associated with said one of the plurality of remote devices and/or a user identifier associated with a user of said device; and after receiving the request, (a) using the device and/or user identifier to select a delivery address to which to send a response, wherein the selected delivery address is associated with a second device that is different than said one of the plurality of remote devices; and (b) sending to the selected delivery address the response, the response comprising (i) a message comprising a link associated with the media content item and/or (ii) the media content item.

16. The method of claim 15, wherein the media content is an audio track and the media content item is a digital file containing the audio track.

17. The method of claim 15, wherein the media content is a music video and the media content item is a digital file containing the audio from the music video.

18. The method of claim 15, wherein the media content is a music video and the media content item is a digital file containing the music video.

19. The method of claim 15, wherein the response includes the message comprising the link and the link is a direct link to the item.

20. The method of claim 15, wherein the response includes the message comprising the link and the link is a link to a server that has access to the item.

21. The method of claim 20, wherein, in response to a user activating the link, a server receives a second request and responds to the second request by transmitting a second response to the device that transmitted the second request, wherein the second response prompts the user of the device to enter an access code.

22. The method of claim 21, wherein the second response is an HTML document.

23. The method of claim 15, wherein the selected delivery address is not an address belonging to said one of the plurality of remote devices.

24. The method of claim 15, wherein the step of using the device and/or user identifier to select a delivery address comprises using the device and/or user identifier to obtain from a database a set of information that is associated with the device identifier and/or the user identifier.

25. A media content delivery method, comprising:
receiving at a user device a set of identifiers transmitted from a media-on-demand system, each identifier identifying a different media content item;
enabling the user to select one of the media content items;
in response to the user selecting one of the media content items, transmitting from the user device to the media-on-demand system an identifier identifying the selected media content item;
after transmitting the identifier to the media-on-demand system, receiving from the media-on-demand system the selected media content item and meta-data associated with the selected media content item, wherein the user device upon receiving the media content item plays the media content item for the user, and wherein the meta-data indicates that the media content item, or a version thereof, may be acquired by the user;
storing the media content item and meta-data received from the media-on-demand system in a storage device contained within or directly connected to the user device;
retrieving from the storage device the stored media content item and meta-data in response to a command from a user;
playing the retrieved media content item for the user of the user device;
while playing the retrieved media content item, receiving at the user device an indication from the user that the user desires to acquire the item or a version thereof; and
in response to receiving the indication, transmitting a message to a fulfillment system, wherein
the message includes a device identifier associated with the user device and/or a user identifier associated with a user of said device, and
in response to receiving the message transmitted to the fulfillment system, the fulfillment system uses the device and/or user identifier to determine a delivery address associated with the device and/or user identifier and delivers the media content item, or a version thereof, to the delivery address.

26. The method of 25, further comprising displaying on a display of the user device an indication that the media content item, or a version thereof, is available to be acquired.

27. The method of 25, wherein the step of delivering the item to the delivery address comprises transmitting the item to the delivery address.

28. The method of 25, wherein the step of delivering the item to the delivery address comprises transmitting to the delivery address an message that includes the item and/or a link to the item.

29. The method of 28, wherein the message is an e-mail message or a text message.

30. The method of claim 25, wherein the delivery address is not an address belonging to the user device.

31. A media content delivery method, comprising:
transmitting media content to a remote device, wherein audio data is associated with the transmitted media content;
storing a plurality of media files corresponding to the transmitted media content, wherein each of said media files stores a different version of the audio data that is associated with the transmitted media content;
while transmitting the media content to the remote device, receiving from the remote device a message, wherein the message includes a device identifier associated with said remote device and/or a user identifier associated with a user of said device; and
upon receiving the message, (a) using the device and/or user identifier to retrieve from a database information associated with the identifier, wherein the information includes a delivery address; (b) selecting from among the plurality of media files a single one of the media files, wherein the selection is based on information in the message and/or at least some of the retrieved information, and (c) transmitting to the delivery address the selected media file and/or a link to the selected media file, wherein the message further includes a format identifier and the step of selecting one of the media files comprises selecting from the plurality of media files a media file that contains a version of the audio data that matches the format identified by the format identifier.

* * * * *